(12) United States Patent
Tompkins (10) Patent No.: US 8,412,810 B1
(45) Date of Patent: Apr. 2, 2013

(54) PROVISIONING AND MANAGING A CLUSTER DEPLOYED ON A CLOUD

(75) Inventor: David Tompkins, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 340 days.

(21) Appl. No.: 12/830,080

(22) Filed: Jul. 2, 2010

(51) Int. Cl.
*G06F 15/173* (2006.01)

(52) U.S. Cl. ........ 709/223; 709/201; 709/202; 709/203; 709/224

(58) Field of Classification Search .................. 709/201, 709/202, 203, 223, 224, 220
See application file for complete search history.

(56) References Cited

U.S. PATENT DOCUMENTS

| | | | | |
|---|---|---|---|---|
| 7,689,685 B2* | 3/2010 | Ahmed et al. | ................ | 709/224 |
| 7,941,432 B2* | 5/2011 | Culbertson | ................... | 707/736 |
| 8,069,435 B1* | 11/2011 | Lai | ................. | 717/106 |
| 2005/0080885 A1* | 4/2005 | Ahmed et al. | ................ | 709/223 |
| 2005/0080982 A1* | 4/2005 | Vasilevsky et al. | ............... | 711/1 |
| 2005/0160424 A1* | 7/2005 | Broussard et al. | ................ | 718/1 |
| 2009/0119642 A1* | 5/2009 | Brendle et al. | ................ | 717/116 |
| 2009/0193414 A1* | 7/2009 | Broussard et al. | ................ | 718/1 |
| 2011/0320224 A1* | 12/2011 | Sen et al. | .......................... | 705/4 |

* cited by examiner

*Primary Examiner* — Liangche A Wang
(74) *Attorney, Agent, or Firm* — Schwegman Lundberg Woessner P.A.

(57) ABSTRACT

A system is provided to provision and manage cloud-based clustered application deployment. In one example embodiment, a cloud-based clustered application deployment uses a three tier topology that includes a load balancing tier, an application tier, and a database tier. Each tier comprises a set of nodes, where each node is implemented using a virtual instance of a machine running within a public virtualization space, such as, e.g., the virtualization space provided by Amazon's Elastic Compute Cloud (EC2) service. A controller is provided to enforce sequential start sequence of a cluster using an asynchronous messaging system that provides notifications to cluster nodes as the individual nodes of the cluster become available. This messaging system is also used when the size of the cluster is increased or decreased.

19 Claims, 7 Drawing Sheets

PROVISIONING AND MANAGING A CLUSTER DEPLOYED ON A CLOUD

TECHNICAL FIELD

This disclosure relates generally to the technical fields of software and/or hardware technology and, in one example embodiment, to system and method to provision and manage a clustered computing application deployed on a cloud.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The phrase "cloud computing" refers to an architectural paradigm, in which computation is moved from local servers to a remote service that provides computation as a commodity or utility. A "cloud" is typically a large collection of shared commodity computation resources that can be interchangeably provisioned in response to clients' computation requests. Cloud computing is frequently used in software-as-a-service (SaaS) application architectures and may be viewed as an implementation choice for application deployment that leverages shared resources and improved cost structure of the cloud. A cloud computing approach may be used to implement a variety of computational paradigms, such as virtual machines, jobs, remote procedure calls, traditional servers, etc.

A computing application that is deployed on more than one machine (node) is termed a clustered computing application (or merely a clustered application or a cluster). For example, a clustered application may comprise a load balancer, a database, and an application server, where the load balancer is deployed on one node, the database server is deployed on another node, while the application server is deployed on a further node. Historically, clustered applications have been deployed using hardware that is statically allocated to a cluster, thereby defining both the cost of running a cluster and the peak load that it could support. In the event of increased load, new hardware would be purchased and brought online, and the cost of running the cluster would increase. In the event of decreased load, there is no corresponding way to decommission hardware and realize cost savings. Furthermore, the period of time that would elapse between the urgent need for more capacity and its availability would typically be measured in days or weeks.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Method and system are described to provision and manage cloud-based clustered application deployment. In one example embodiment, a cloud-based clustered application deployment uses a three tier topology that includes a load balancing tier, an application tier, and a database tier. Each tier comprises a set of nodes, where each node is implemented using a virtual instance of a machine running within a public virtualization space, such as, e.g., the virtualization space provided by Amazon Elastic Compute Cloud (EC2) service.

The nodes in one tier of a clustered application are homogenous in that they each use the same machine image stored in the public storage space. Thus, the same machine image is used for launching each of the nodes in the application tier, while a different machine image is used to launch a node in the load balancing tier, and still another machine image is used to launch one or more nodes in the database tier. The machine images, which are read-only boot images that are used for launching cluster nodes, are provided by a control server (also referred to as a controller). The controller is configured to enforce sequential start sequence of a cluster using an asynchronous messaging system that provides notifications to cluster nodes as the individual nodes of the cluster become available. This messaging system is also used when the size of the cluster is increased or decreased, providing change notifications to nodes that subscribe to these notifications.

A clustered application that comprises a set of nodes grouped into several logical tiers may distribute the load of the application across the nodes in order to support loads that are higher than single standalone instances can handle. A set of techniques for optimizing a clustered computing application in response to varying load may be referred to as elastic scalability. Elastic scalability may be supported in two modes: manual and rule-based. In the manual mode, the size of a cluster can be increased or decreased in response to commands from an administrator initiated, e.g., through the cluster dashboard user interface (shown in FIG. 6). In the rule-based mode, the size of a cluster can be increased or decreased automatically in response to a set of logical rules that are evaluated periodically by the controller. These rules may be based on load measurements, application performance metrics, usage patterns, and user-specified data and business logic. In general, the manual mode may be provided to allow an administrator to override rule-based cluster sizing functions when needed; however, the rule-based mode allows the cluster to operate more efficiently and autonomously in response to load conditions, which may result in a lower operational cost for the cluster and a quicker response to changes in load.

A system that provisions and manages a computing application hosted on one or more virtual nodes may be referred to as a hosted service system. A hosted service system may be configured to provide automated administration of a computing application, replacing the administration tasks that would otherwise be performed by the customer when running in an on-premise production deployment. The technology within an example hosted service system may hide the behavior of the underlying virtualization service, and provide instances of a computing application that are substantially indistinguishable (e.g., in terms of reliability, security, and performance) from local on-premise deployments of the computing application. An example computing applications that a hosted service system may provision and manage are Adobe® LiveCycle® Enterprise Suite (ES) and Adobe® ConnectPro® offered by Adobe Systems Incorporated. While embodiments of the hosted service system are described with reference to Amazon EC2 service, other virtualization services may be utilized.

In operation, a user can access a provider's web site and request to launch a computing application that can be deployed remotely on a plurality of virtual nodes (on a cloud) such that the user no longer is required to deploy the computing application locally, within their own data center, on their own hardware. A request may be triggered by a user, e.g., by activating a visual control such as a "Start" button presented on a web page. When a hosted service system receives a request to launch a computing application, a call is made to the application programming interface (API) associated with the virtualization service to trigger the loading of machine images associated with respective tiers of the requested computing application. In one embodiment, where a clustered application comprises a load balancing tier, an application tier, and a database tier, the load balancing tier and the database tier initially may each comprise one virtual node, while the application tier may initially comprise a plurality of virtual nodes. A request to launch a clustered computing application may be triggered explicitly by a user or automatically. The associated node is loaded with the contents of the machine image. In one embodiment, nodes of a load balancing tier are launched using a load balancer machine image, nodes of an application tier are launched using an application server machine image, and nodes of a database tier are launched using a database server machine image.

Figure 1:
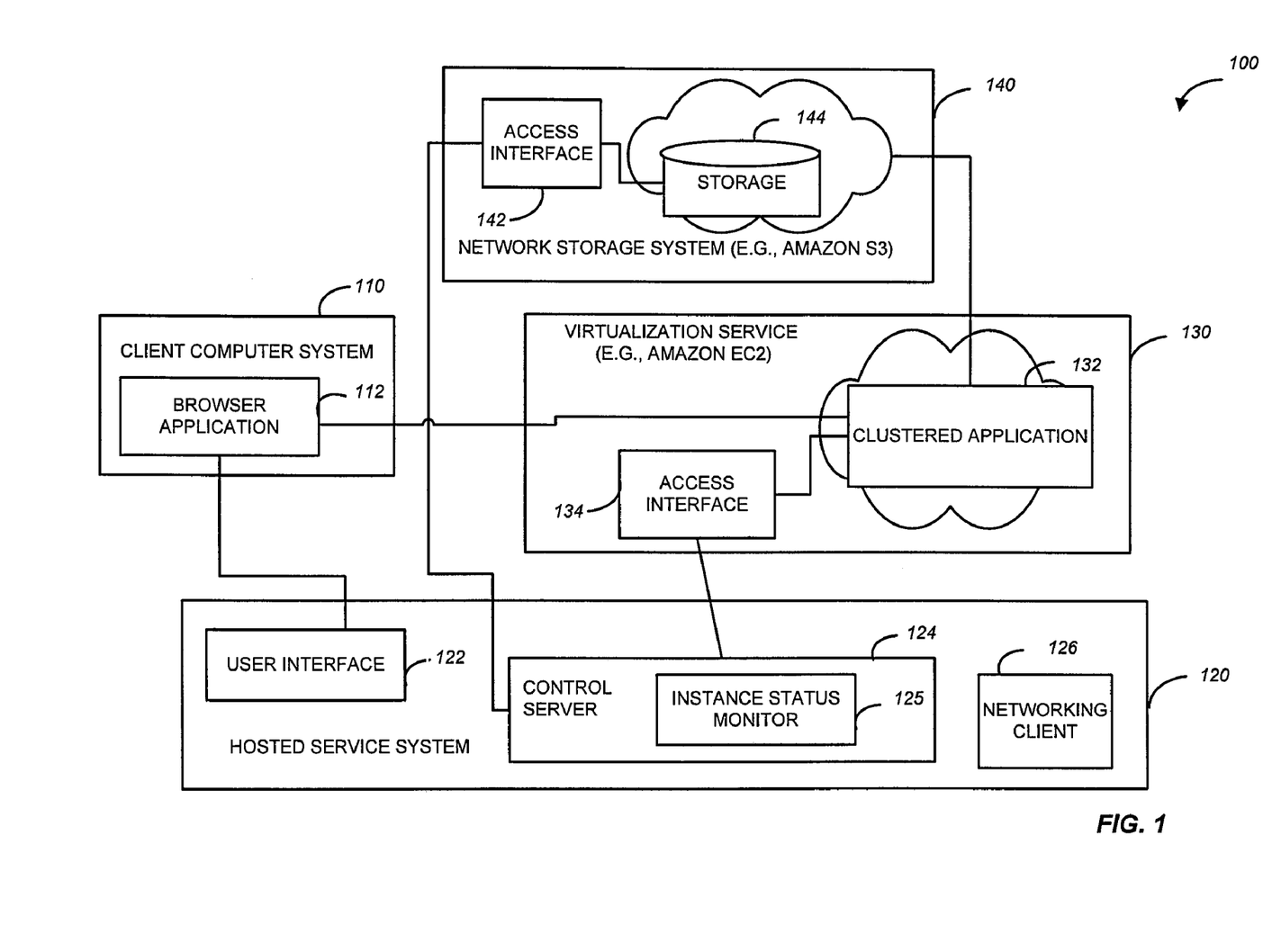
FIG. 1 is a block diagram showing an architecture within which a method and system to provision and manage a clustered computing application deployed as a cloud may be implemented, in accordance with an example embodiment.

An example architecture within which method and system to provision and manage a clustered computing application hosted by a plurality of virtual nodes may be implemented is described with reference to an architecture diagram illustrated in FIG. 1. The architecture 100 may include a client computer system 110 and a hosted service system 120. In one example embodiment, the hosted service system 120 is to provision and manage an enterprise SaaS product utilizing a cloud-based computing service as a virtualization infrastructure. Cloud-based computing services are shown in FIG. 1 as a virtualization service 130 and a network storage service 140. In one embodiment, a hosted service system 120 utilizes Amazon EC2 as a virtualization service and Amazon Simple Storage Service (Amazon S3) as a network storage service. The client computer system 110 and the hosted service system 120 may be in communication with each other via a communications network that may be a public network (e.g., the Internet).

The virtualization service 130 may load a clustered application 132 onto a cloud. The clustered application 132 may be accessed by the client 110 via a browser application 112. As mentioned above, a user in control of the client computer system 110 may send a request to the hosted service system 120 to load the computing application. The request may be initiated via a user interface 122 provided by the hosted service system 120 to the client computer system 110 via the browser application 112.

The user interface 122, in one embodiment, provides both an end-user's and a system administrator's view of the clustered application 132 and also permits issuing control operations to the clustered application 132 and permits viewing the resulting changes in the state of the clustered application 132. For example, where the clustered application is LiveCycle®, an end-user may manipulate various electronic forms. The user interface 122 may also serve as a source of information for the hosted service system 120, including documentation, downloads, and support. The user interface 122, in one embodiment, uses Adobe® Flex® software, offered by Adobe Systems Incorporated, as the user interface technology for the implementation of the user interface. The user interface 122, in one embodiment, uses an XML (Extensible Markup Language)-based representational state transfer (REST) style secure communications protocol to synchronize its operations with a control server 124. A request to access the user interface 122 may be authenticated using one of a variety of authentication techniques.

The request from the client computer system 110 to load the clustered application 132 is received at the control server 124, which responds to the request by activating an access interface 134 provided by the virtualization service 130. The control server 124, in one example embodiment, provides coordination between the components of the architecture 100, provides administration and monitoring of the virtualization service 130, and also may be configured to audit system usage and resource allocation with respect to the clustered application 132. The control server 124 includes a database to store information pertaining to various aspects of system usage. The control server 124, in one embodiment, runs within a standard Hypertext Transfer Protocol Secure (HTTPS)-compliant web server and may be deployed as a publically accessible web application that is available outside a firewall. The control server 124, in one embodiment, is implemented using Ruby on Rails™ technology.

The virtualization service 130 accesses the storage 144 of the network storage system 140 to obtain machine images in order to load the associated clustered application 132. The machine images can be uploaded to the network storage system by the control server 124 utilizing an access interface 142 provided with the network storage system 140. As mentioned above, the machine images obtained by the virtualization service 130 include a machine image for one or more virtual nodes running one or more load balancers, a machine image for one or more virtual nodes running one or more application nodes, and a machine image for one or more virtual nodes running one or more database nodes. The communications from the clustered application 132 to the control server 124, may include enforcing sequential start sequence of the clustered application 132 and providing notifications to cluster nodes of the clustered application 132 as the individual nodes of clustered application 132 become available, as well as providing notifications to cluster nodes of the clustered application 132 when the size of the cluster is increased or decreased.

The hosted service system 120 further includes a secure networking client 126 to provide a bidirectional, encrypted, compressed connection between a machine in the end-user's secure network environment (e.g., the client computer system 110) and a virtual node running within the virtualization infrastructure (the clustered application 132). The networking client 126 manages various aspects of transmission control protocol (TCP) traffic forwarding, encryption, and network discovery, such that the user can access the clustered application 132 as if it was running locally on the user's machine. In this mode, the user's network security envelope is extended to surround the clustered application 132 using comparable levels of encryption and protection against network security threats.

Figure 2:
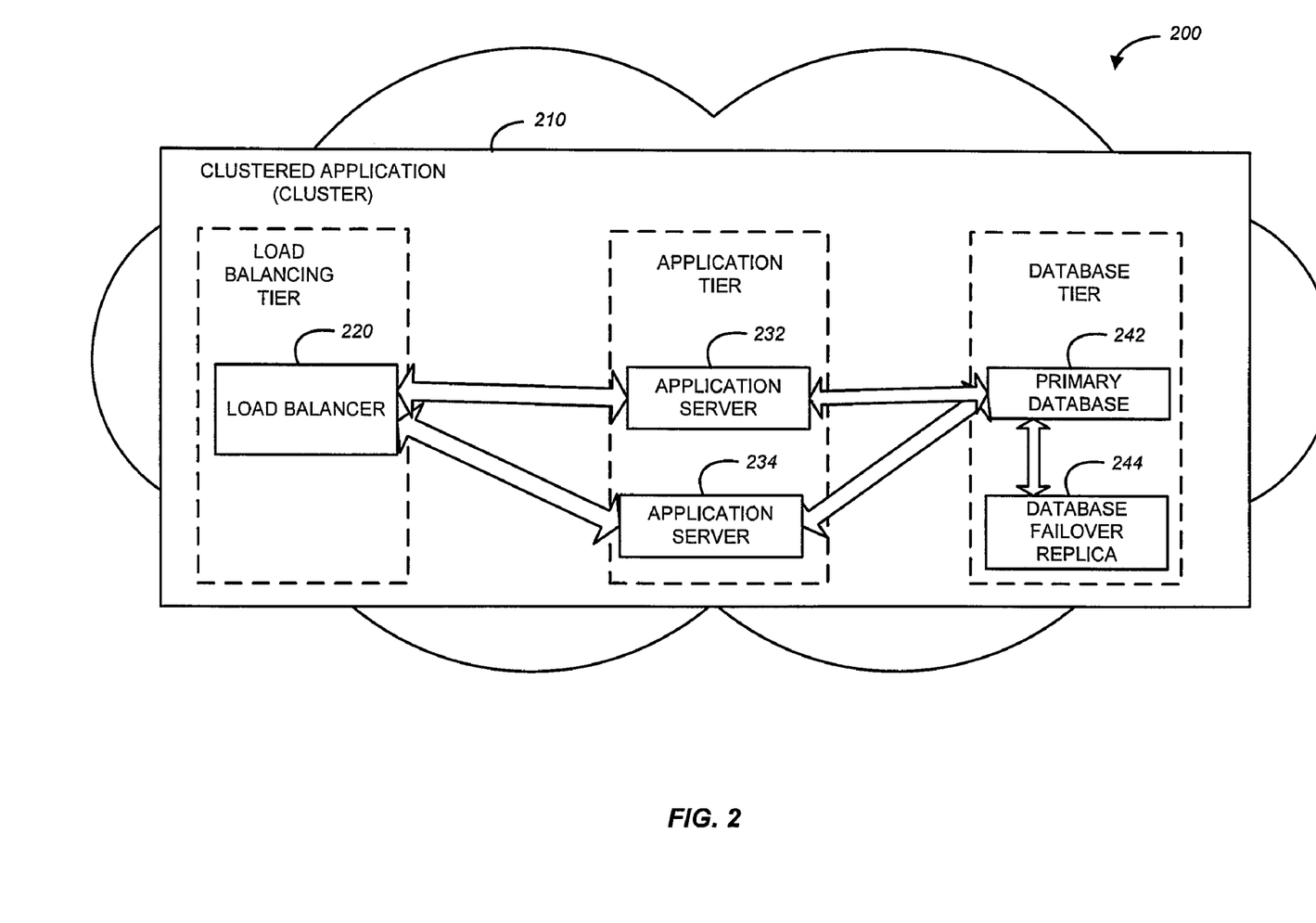
FIG. 2 is a diagrammatic representation of a tree-tiered clustered computing application, in accordance with an example embodiment.

A diagrammatic representation 200 of a tree-tiered clustered computing application is shown in FIG. 2. As shown in FIG. 2, a cluster 210 comprises a load balancing tier comprising a load balancer node 220, t application tier comprising two application server nodes 232 and 234, and a database tier comprising a primary database node 242 and a database failover replica node 244.

Figure 3:
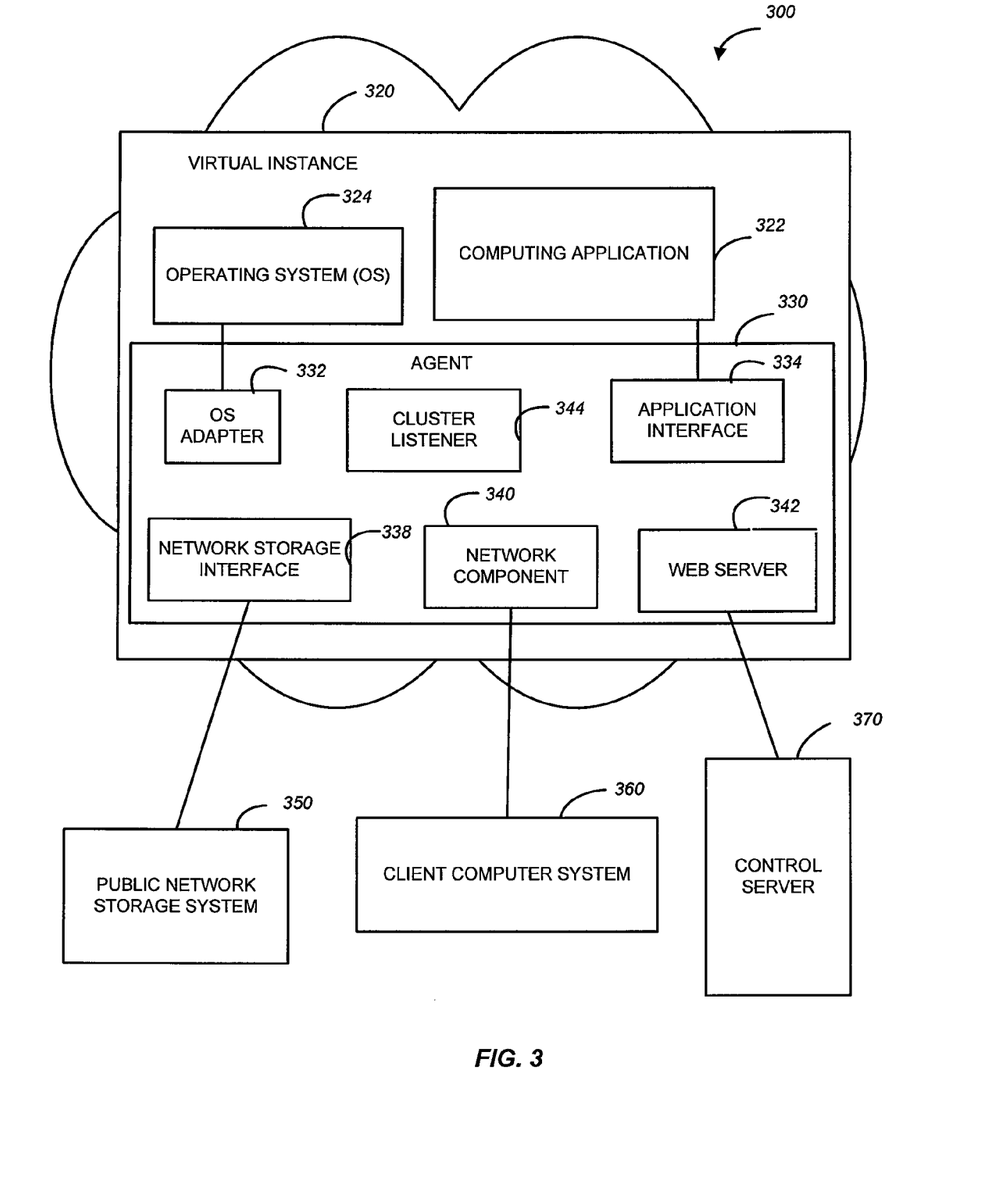
FIG. 3 is a block diagram illustrating a cluster node hosted by a virtual instance of a machine, in accordance with an example embodiment.

FIG. 3 is a block diagram illustrating a node in a clustered application hosted by a virtual instance of a machine, in accordance with an example embodiment. As shown in FIG. 3, the system 300 includes a virtual instance 320 that is in communication with a public network storage system 350, a client computer system 360, and a control server 370. The virtual instance 320, which is a node in a cluster of nodes that together host a clustered computing application, comprises an operating system 324, a computing application 322, and an agent 330. The computing application 322 may be a load balancer (if the virtual instance 320 is a load balancer node in the cluster), a database server (if the virtual instance 320 is a database node in the cluster), or an application server (if the virtual instance 320 is an application node in the cluster).

The agent 330 is provided to permit communications between the virtual instance 320 and the network storage system 350, the client computer system 360, and the control server 370. The agent 330 includes an operating system (OS) adapter 332 to facilitate communication between the agent 330 and the operating system 324 and an application interface 334 to facilitate communications between the computing application 322 and the agent 320. A network storage interface 338 is configured to facilitate communications between the network storage system 350 and the agent 330. A network component 340 is configured to facilitate communications between the client computer system 360 and the agent 330. A web server 342 is configured to facilitate communications between the control server 370 and the agent 330. Another component of the agent 230 is a cluster listener 344. The cluster listener 344 that subscribes to cluster change messages. the cluster listener 344, upon receiving of a cluster change message, makes changes to the state of the computing application 322 based on the change to the cluster.

The control server 370, in one example embodiment, is a web server that provides a web application architecture, in which objects are modeled within a relational database and actions performed on those objects are methods within a set of controllers. As mentioned above, the control server 370 is configured to enforce the start sequence of the cluster and to provide change notifications to the nodes in the cluster, using asynchronous messaging system. The control server 370 keeps track of the state of the nodes in the cluster and the links between the nodes, and also supports elastic scalability of the cluster by managing automatic changes in the size of the cluster. Some components of the control server 370 are described with reference to FIG. 4.

Figure 4:
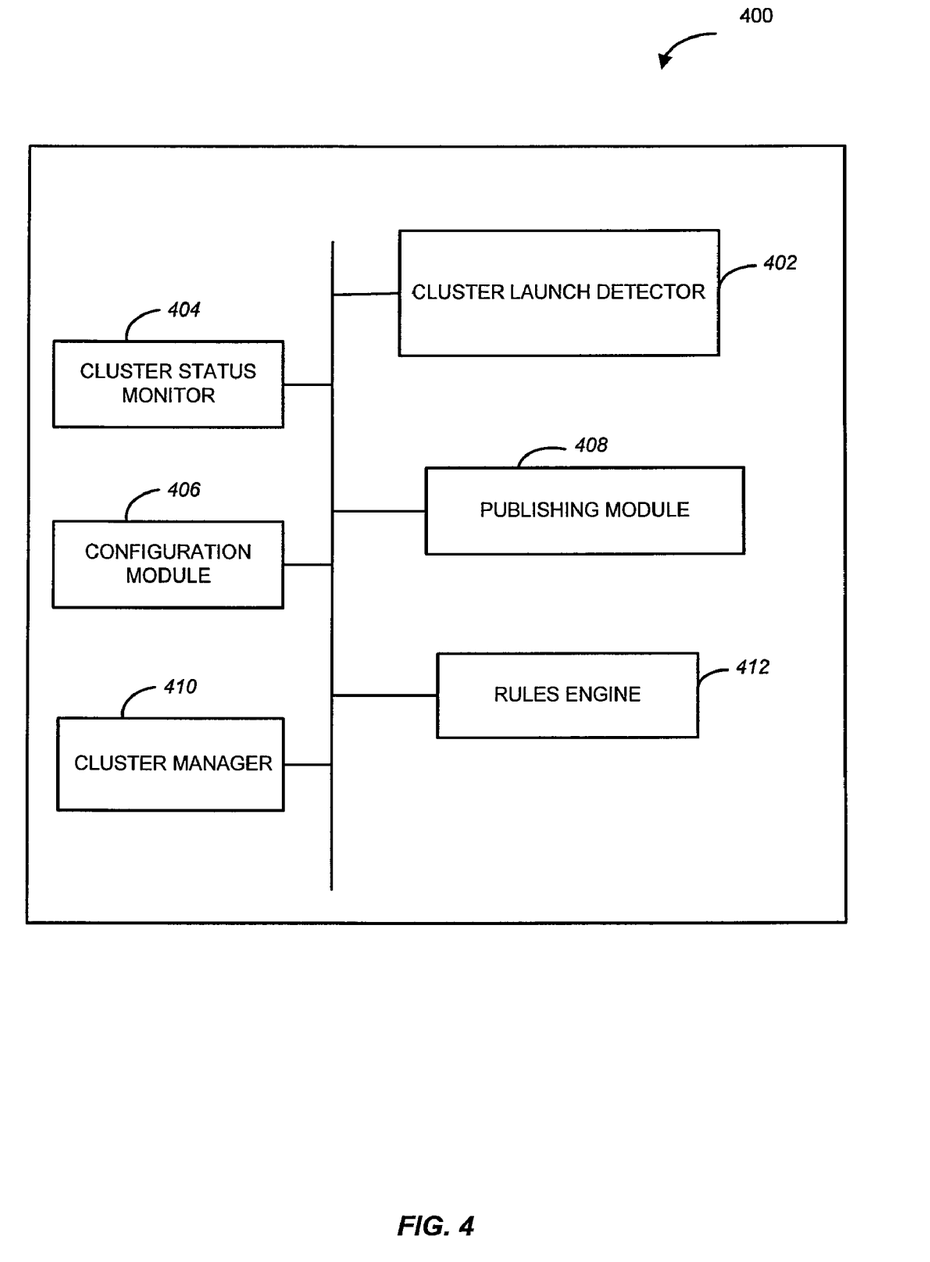
FIG. 4 is a block diagram illustrating some components of a control server, in accordance with an example embodiment.

FIG. 4 is a block diagram illustrating a system 400 for provisioning and managing a clustered computing application deployed on a cloud, according to one example embodiment. As shown in FIG. 4, the system 400 includes a cluster launch detector 402, a cluster status monitor 404, a configuration module 406, a publishing module 408, a cluster manager 410, and a rules engine 412. The cluster launch detector 402 may be configured to detect a request to launch the clustered computing application on the cluster of nodes and also to detect that a clustered computing application has been launched on a cluster of nodes, each node in the cluster being a virtual instance of a machine within a virtualization service.

The cluster status monitor 404 may be configured to monitor status of the nodes in the cluster to detect availability various nodes, e.g., the database server, within the virtualization service. The configuration module 406 may be configured to configure a node, e.g., to configure a load balancer that delivers messages to one or more nodes executing instances of the application server. The publishing module 408 may be configured to issue notification messages addressed to nodes in the cluster. The notification messages may include information that may be used by a node for connecting to the database server provided in the cluster and information for discovering other nodes in the cluster.

The cluster manager 410 may be configured to detect a request to change the size of the cluster and to perform the change in response to the request. The cluster manager 410 cooperates with the rules engine 412. The rules engine 412 may be configured to periodically access various measurements associated with the cluster, evaluate one or more rules based on the measurements, and produce a cluster size change recommendation or request. The cluster manager 410 may be configured to process the cluster size change request. The modules illustrated in FIG. 4 may be implemented as software, hardware, or a combination of both. Various operations performed by the system 400, according to an example embodiment, are discussed with reference to FIG. 5.

Figure 5:
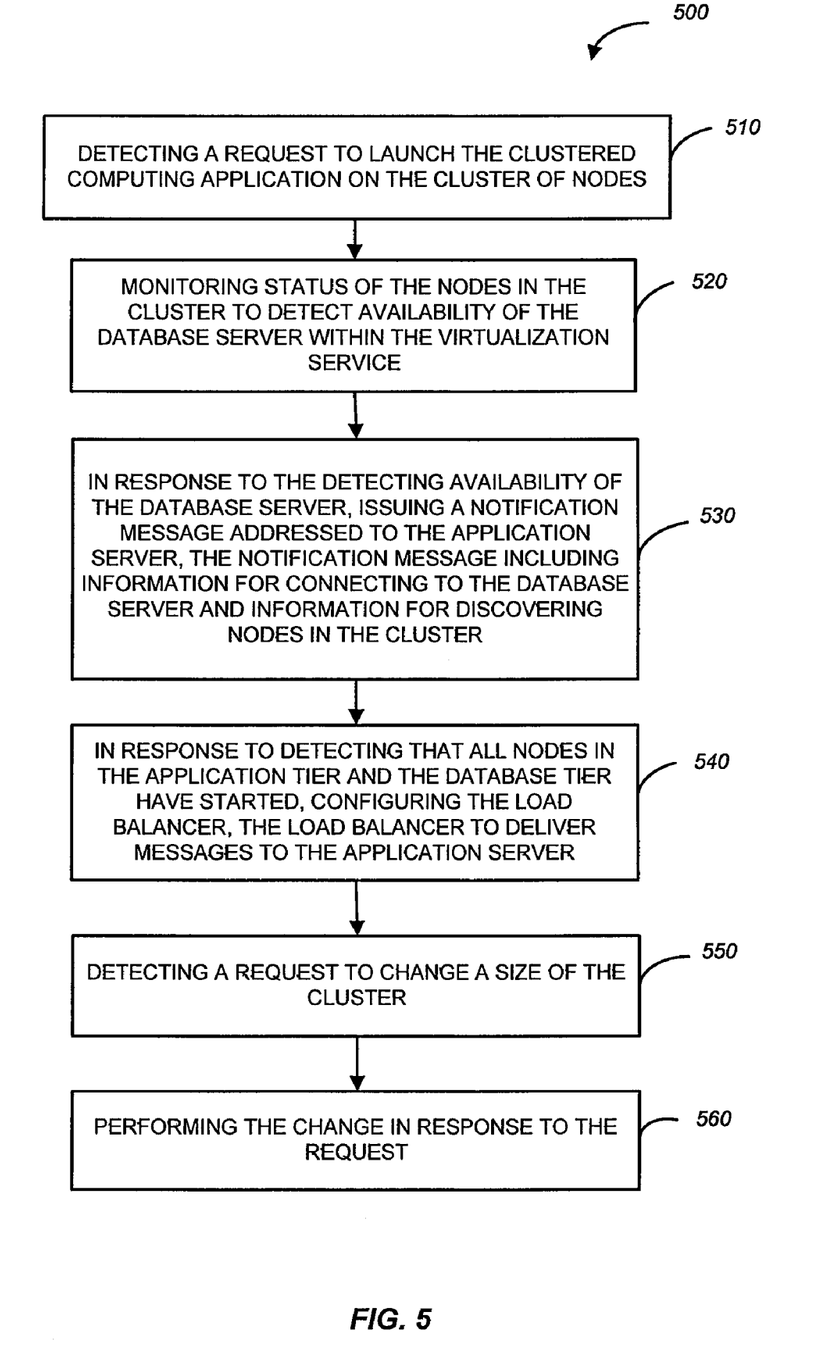
FIG. 5 is a flow chart illustrating a method to provision a clustered computing application deployed on a cloud, in accordance with an example embodiment.

FIG. 5 is a flow chart illustrating a method 500 to provision a clustered computing application deployed on a cloud, in accordance with an example embodiment. The method 500 may be performed by processing logic that may comprise hardware, software (such as run on a general purpose computer system programmed to perform particular functions pursuant to instructions from program software or on a dedicated machine), or a combination of both. The processing logic, according to example embodiments, may reside in or comprise any of the modules shown in FIG. 4.

As shown in FIG. 5, the method 500 commences with operation 510, where the cluster launch detector 402 of FIG. 4 detects a request to launch a clustered computing application. As a clustered computing application executes on a cluster of nodes, a clustered computing application may be referred to as merely a cluster. In order to launch a clustered computing application that utilizes as three-tier topology as shown in FIG. 2, all nodes of each tier need to be started within the virtualization service in a manner that permits the nodes of the cluster to cooperate with each other. An example start sequence for a cluster may be described with reference to operations 520-540.

In one example embodiment, in response to a request to launch a clustered computing application, all cluster nodes in the application tier and the database tier are provisioned and started within a virtualization service. A load balancer is provisioned but not configured until all nodes of the application tier and the database have been started. The control server 124 of FIG. 1 monitors the status of the cluster nodes, awaiting the availability of the primary database node. Prior to the availability of the primary database node, any application node reaching the running state will pause during its start sequence to await notification that the primary database node is available. At operation 520, the cluster status monitor 404 of FIG. 4 commences monitoring the status of the nodes in the cluster to detect availability of the database server (e.g., primary database) within the virtualization service.

After the primary database becomes available, the publishing module 408 of FIG. 4 generates asynchronous notification messages addressed to application nodes and to the database failover replica. These messages are stored within a public storage service (such as, e.g., Amazon S3 service). These messages persist within the public storage service until they are retrieved by each addressee node in the cluster. Any node within the cluster that is already running detects and retrieves its notification message. Nodes that have not yet reached the running state retrieve their notification message during their boot sequence. A notification message generated by the publishing module 408 includes connection information for the primary database, and discovery information for the other nodes, if necessary. Thus, at operation 530, in response to detecting availability of the database server, a notification message addressed to the application server is issued.

Each application node will then configure itself to join the cluster and connect to the primary database using the contents of the notification message. The database failover replica will also configure itself for replication of the primary database instance. As is shown in FIG. 4, in response to detecting that all nodes in the application tier and the database tier have started, the configuration module 406 of FIG. 4 configures the load balancer 220 that then becomes available for delivering messages to the application server. While the operations listed in FIG. 4 refer to one application server, the application tier of the cluster may include two or more application servers, each application server running on a separate instance of a virtual machine.

After the load balancer 220 has been configured such that it can deliver massages to the application server node 230, the cluster launch detector 402 detects, at operation 540, that the clustered computing application 210 has been launched on a cluster of nodes, wherein each node in the cluster is a virtual instance of a machine within a virtualization service. Upon completion of this sequence, the cluster is available and ready for use in all respects. The load balancer 220 is assigned a dynamically generated Internet protocol (IP) address and hostname when it is provisioned, which is used to access the cluster. The generated hostname may be replaced with a vanity hostname and a corresponding domain name system (DNS) entry, for each customer in a commercial offering.

At operation 550, the cluster manager 410 of FIG. 4 detects a request to change a size of the cluster, e.g., a request to stop a node in the cluster or start another application server node, to start another database server node or to start another load balancer. The request to stop a node or to start a new node may be issued in response to an operation of a user or as a result of execution of one or more rules by the rules engine 412 of FIG. 4. At operation 560, the cluster manager 410 performs the change in response to the request.

For example, when the request to change a size of the cluster is a request to change the size of the application tier, either adding or removing application nodes, the control server 124 may operate as described below. Additional cluster nodes in the application tier are started or stopped as requested. Asynchronous notification messages addressed to all application nodes and database nodes are issued. In one embodiment, when adding nodes to the cluster, notification messages contain the same information that a cluster node would receive during the cluster start sequence. When removing nodes from the cluster, notification messages contain information about the removed nodes. Once the cluster size change has completed and all affected nodes have started or stopped, respectively, then the load balancer is reconfigured with the changes. Upon completion of this sequence, the cluster size has been changed and the newly configured cluster is ready for use in all respects.

Figure 6:
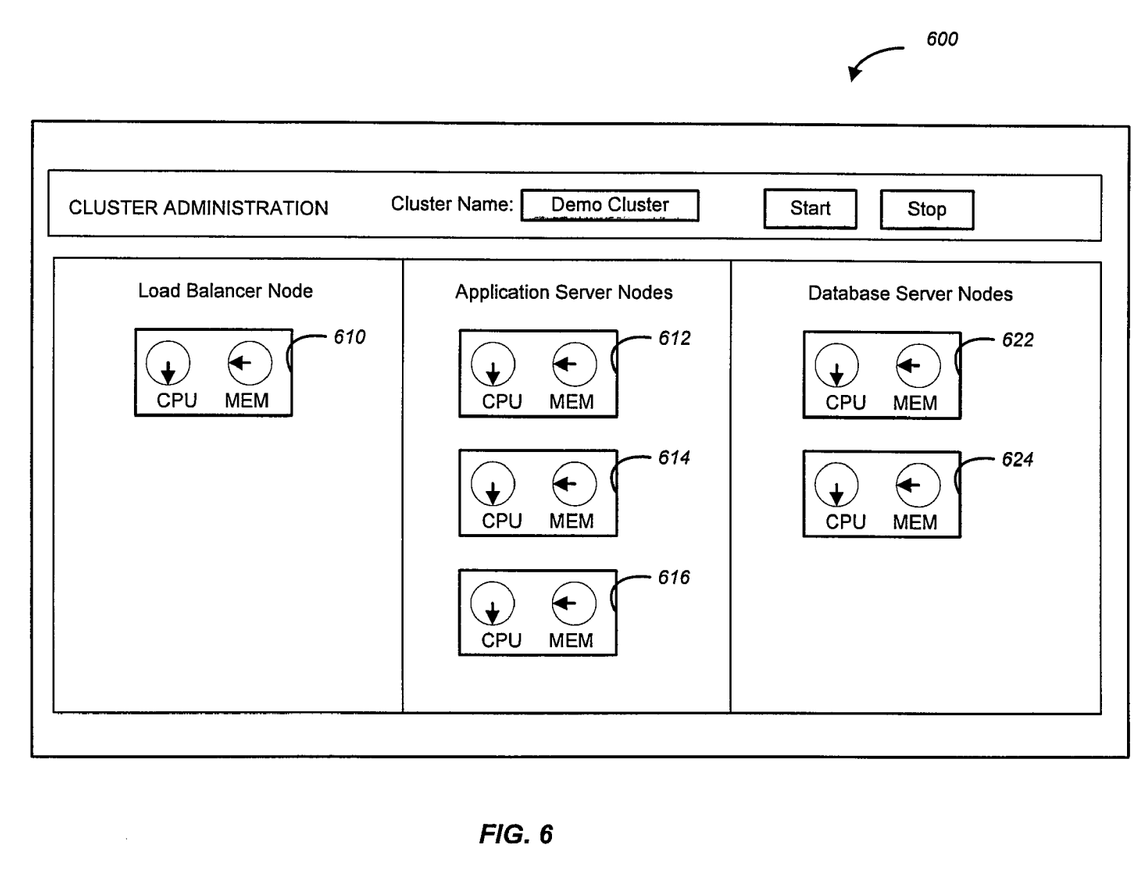
FIG. 6 is a diagrammatic representation of a user interface for displaying topology of a clustered application to a user, in accordance with an example embodiment.

FIG. 6 is a diagrammatic representation of a user interface for displaying topology of a clustered application to a user, in accordance with an example embodiment. A user interface 600, as shown in FIG. 6 provides a visual representation of the three tiers of a clustered application, where a load balancing tier includes one load balancer node (610), the application tier includes three application server nodes (612, 614, and 616), and the database tier includes two database server nodes (622 and 624). The database server node 622 may host the primary database, and the database server node 624 may host the database failover replica. The user interface 600 may also display one or more visual controls to permit a user (e.g., an administrator) to start, stop, grow, shrink, or share a cluster. Each cluster node may be displayed to provide performance metrics that are collected periodically for every virtual instance that is part of the cluster, along with an updated dashboard gauge view to reflect the health of the cluster as a whole. In one embodiment, the user interface 600 may be implemented using Flex®.

In one example embodiment, cluster type specifications that describe the contents and sizing of the cluster tiers may be created using XML. This approach provides an extensible mechanism to define new cluster topologies for using clustered applications. An example of a cluster definition for the default three-tier web conferencing application is shown below in Table 1.

TABLE 1

```
<cluster-definition>
    <name>Connect Pro 7.5 Standard</name>
    <tier-definition>
        <name>Load Balancers</name>
        <type>LB</type>
        <elastic-enabled>false</elastic-enabled>
        <min-size>1</min-size>
        <max-size>1</max-size>
    </tier-definition>
    <tier-definition>
        <name>Connect Pro Application Servers</name>
        <type>APP</type>
        <elastic-enabled>true</elastic-enabled>
        <min-size>2</min-size>
        <node-type>
            <name>Connect Pro 7.5 Node</name>
            <ami-id>ami-d1fd13b8</ami-id>
            <instance-type>m1.large</instance-type>
        </node-type>
    </tier-definition>
    <tier-definition>
        <name>SQL Server 2005 Instances</name>
        <type>DB</type>
        <elastic-enabled>false</elastic-enabled>
        <min-size>1</min-size>
        <max-size>1</max-size>
        <node-type>
            <name>SQL Server 2005 Primary Database</name>
            <ami-id>ami-d93ed2b0</ami-id>
            <instance-type>m1.large</instance-type>
        </node-type>
    </tier-definition>
</cluster-definition>
```

The cluster definition, such as the definition shown in Table 1 above, is used by the control server 124 of FIG. 1 and also by the user interface 600 of FIG. 6 to specify and coordinate cluster functions. In the control server 124, the cluster definition is used when starting a cluster and also during elastic scaling functions. In the user interface 600, the cluster definition is used to describe cluster options and selectable or optional cluster behavior.

As mentioned above, a cloud-based deployment of a clustered application may be configured to permit elastic scalability where a node from any of the tiers may be added to or removed from the cluster. Rule-based elastic scalability may be implemented using the rules engine 412 of FIG. 4 that is configured to evaluate a set of logical rules that have been specified for a given cluster. Rule expressions can be composed of any combination of arithmetic operators and data available within the controller. Some examples of available data include:

Load Measurements, such as the average round trip time of a performance test Uniform Resource Locator (URL);
Health Tests, such as the availability or response time of a health check URL;
Operating System or Application Metrics, such as a central processing unit (CPU) utilization threshold;
Usage Patterns, such as time-based or calendar-based scaling directives;
Cost Constraints, such as minimum or maximum cluster sizes; and
User-Specified Data and Logic, such as the result of a custom database query.

Rules may be specified individually for any cluster within the system, e.g., using a language grammar derived from Ruby on Rails™, using XML rule specification format, or any other rule format. Rules may also be specified collectively for any set of clusters belonging to a single user. The set of rules for a given cluster may be evaluated in priority order, where priority is defined as a value, e.g., in [1,100]—with 1 as the highest priority and 100 as the lowest—and each rule is assigned a priority value. Each rule may also specify that further rule evaluation for the cluster is to continue or halt depending on the evaluation output of the rule.

In one example embodiment, a background thread within the controller is responsible for periodically evaluating the set of rules and autonomously modifying the state of each cluster accordingly. The background thread may execute with a configurable frequency (e.g., the rules may be evaluated every 30 seconds), and the results of the evaluation of each rule and any cluster commands that were performed are stored in an event log in the system database. A set of default rules for basic cluster management may be provided by default for any cluster. An editor to compose and register custom rules for a cluster may be made available via the cluster dashboard view.

Figure 7:
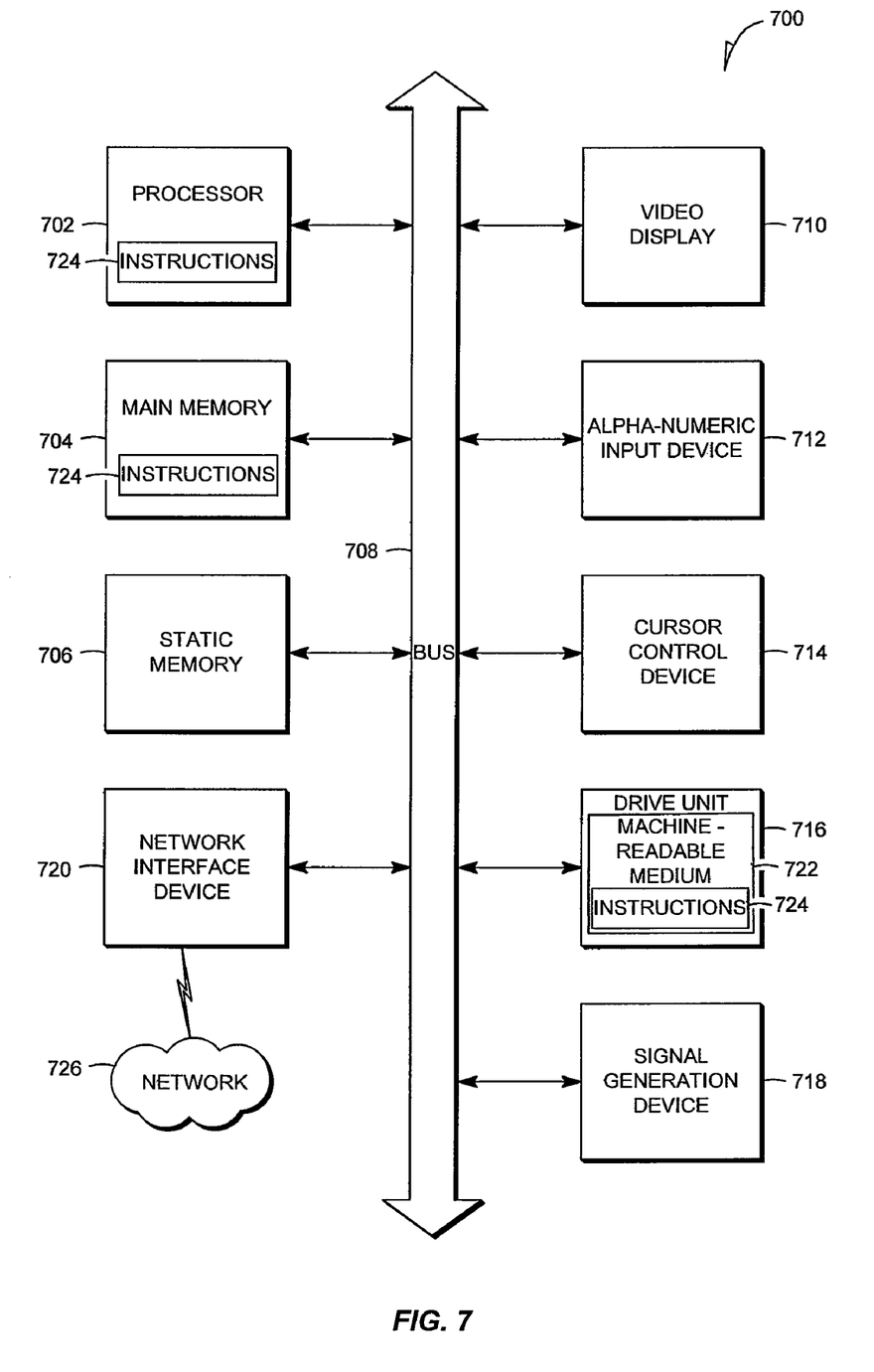
FIG. 7 is a diagrammatic representation of a machine in the example form of a computer system within which a set of instructions, for causing the machine to perform any one or more of the methodologies discussed herein, may be executed.

FIG. 7 is a diagrammatic representation of a machine in the example electronic form of a computer system 700 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) cursor control device 714 (e.g., a mouse), a disk drive unit 716, a signal generation device 718 (e.g., a speaker) and a network interface device 720.

The disk drive unit 716 includes a computer-readable (or machine-readable) medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

Thus, method and system to provision and manage a clustered computing application deployed on a cloud have been described. While some example approaches described herein may be used with ADOBE® products, the techniques described herein may be utilized beneficially with various other products.

The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented method comprising:
   detecting, at a computer, that a clustered computing application has been launched on a cluster of nodes, each node in the cluster being a virtual instance of a machine within a virtualization service, the clustered computing application comprising:
   a load balancing tier comprising a load balancer executing on a first node in the cluster,
   an application tier comprising an application server executing on a second node in the cluster, and
   a database tier comprising a database server executing on a third node in the cluster;
   monitoring status of the nodes in the cluster to detect availability of the database server within the virtualization service;
   in response to the detecting availability of the database server, issuing a notification message addressed to the second node executing the application server, the notification message including information for connecting to the database server and information for discovering nodes in the cluster;
   in response to detecting that all nodes in the application tier and the database tier have started configuring the load balancer, the load balancer to deliver messages to the second node executing the application server;
   detecting a request to change a size of the cluster; and
   performing the change in response to the request.

2. The method of claim 1, comprising assigning an IP address and a hostname to the load balancer, the IP address to be used for accessing the clustered computing application.

3. The method of claim 1, comprising storing the notification message within a public storage service, the public storage service being accessible by the clustered computing application.

4. The method of claim 1, wherein the application server is from a plurality of application servers, each of the application servers from the plurality of application servers executing on a separate node from the cluster.

5. The method of claim 1, wherein the database server is from a plurality of database servers, each of the database servers from the plurality of database servers executing on a separate node from the cluster.

6. The method of claim 1, wherein the load balancer is from a plurality of load balancers, each of the load balancers from the plurality of load balancers executing on a separate node from the cluster.

7. The method of claim 1, wherein the request to change the size of the cluster is a request to start an additional node hosting an additional application server, the additional application server being part of the clustered computing application.

8. The method of claim 1, wherein the request to change the size of the cluster is a request to stop the node hosting the application server, the application server being from a plurality of application servers of the clustered computing application.

9. The method of claim 1, wherein the request to change the size of the cluster is in response to executing one or more rules provided by a rules engine.

10. A computer-implemented system comprising:
    a cluster launch detector to detect that a clustered computing application has been launched on a cluster of nodes, each node in the cluster being a virtual instance of a machine within a virtualization service, the clustered computing application comprising:
    a load balancing tier comprising a load balancer executing on a first node in the cluster,
    an application tier comprising an application server executing on a second node in the cluster, and
    a database tier comprising a database server executing on a third node in the cluster;
    a cluster status monitor to monitor status of the nodes in the cluster to detect availability of the database server within the virtualization service;
    a publishing module to issue, in response to the detecting availability of the database server, a notification message addressed to the second node executing the application server, the notification message including information for connecting to the database server and information for discovering nodes in the cluster;
    a configuration module to configure the load balancer, the load balancer to deliver messages to the second node executing the application server; and
    a cluster manager to:
    detect a request to change a size of the cluster, and
    perform the change in response to the request.

11. The system of claim 10, wherein the configuration module is to assign an IP address and a hostname to the load balancer, the IP address to be used for accessing the clustered computing application.

12. The system of claim 10, wherein the publishing module is to store the notification message within a public storage service, the public storage service being accessible by the clustered computing application.

13. The system of claim 10, wherein the application server is from a plurality of application servers, each of the application servers from the plurality of application servers executing on a separate node from the cluster.

14. The system of claim 10, wherein the database server is from a plurality of database servers, each of the database servers from the plurality of database servers executing on a separate node from the cluster.

15. The system of claim 10, wherein the load balancer is from a plurality of load balancers, each of the load balancers from the plurality of load balancers executing on a separate node from the cluster.

16. The system of claim 10, wherein the request to change the size of the cluster is a request to start an additional node hosting an additional application server, the additional application server being part of the clustered computing application.

17. The system of claim 10, wherein the request to change the size of the cluster is a request to stop the node hosting the application server, the application server being from a plurality of application servers of the clustered computing application.

18. The system of claim 10, comprising a rules engine, wherein the request to change the size of the cluster is in response to executing one or more rules provided by the rules engine.

19. A tangible machine-readable storage medium in communication with at least one processor, the tangible machine-readable storage medium having instructions which when executed by the at least one processor, data to cause a machine to perform operations comprising:
  detecting that a clustered computing application has been launched on a cluster of nodes, each node in the cluster being a virtual instance of a machine within a virtualization service, the clustered computing application comprising:
    a load balancing tier comprising a load balancer executing on a first node in file cluster,
    an application tier comprising an application server executing on a second node in the cluster, and
    a database tier comprising a database server executing on a third node in the cluster;
  automatically determining, using a rules engine, that a new node is to be added to the cluster, the new node to execute the application server;
  causing a new virtual instance of a machine to be started, the new instance executing the application server;
  issuing, in response to detecting availability of the new node, a notification message addressed to the new node executing the application server, the notification message including information for connecting to the database server and information for discovering nodes in the cluster; and
  configuring the load balancer, the load balancer to deliver messages to the application server.

* * * * *

UNITED STATES PATENT AND TRADEMARK OFFICE
CERTIFICATE OF CORRECTION

PATENT NO.        : 8,412,810 B1
APPLICATION NO.   : 12/830080
DATED             : April 2, 2013
INVENTOR(S)       : David Tompkins Page 1 of 1

It is certified that error appears in the above-identified patent and that said Letters Patent is hereby corrected as shown below:

In the Claims

In column 11, line 65, in Claim 1, after "started", insert --,--, therefor

In column 11, line 67, in Claim 1, delete "server:" and insert --server;--, therefor In column 14, line 2, in Claim 19, after "processor,", delete "data to", therefor In column 14, line 10, in Claim 19, delete "file" and insert --the--, therefor Signed and Sealed this
Eighteenth Day of June, 2013

Teresa Stanek Rea
*Acting Director of the United States Patent and Trademark Office*